US006637085B2

(12) United States Patent
Chi et al.

(10) Patent No.: US 6,637,085 B2
(45) Date of Patent: Oct. 28, 2003

(54) PROCESS FOR RECYCLING ARTICLES CONTAINING HIGH-PERFORMANCE FIBER

(75) Inventors: Cheng-Hang Chi, Midlothian, VA (US); Daniel Michael Fischer, Brentwood, TN (US); Larry John Prickett, Chesterfield, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 118 days.

(21) Appl. No.: 10/047,575

(22) Filed: Oct. 26, 2001

(65) Prior Publication Data

US 2003/0101555 A1 Jun. 5, 2003

(51) Int. Cl.$^7$ .................. D06M 23/00; D01G 13/00
(52) U.S. Cl. .................. 28/100; 28/170; 28/299; 19/98; 19/107; 241/25
(58) Field of Search .................. 28/299, 100, 143, 28/140, 218, 165, 166, 171, 170; 19/98, 105, 107; 57/75, 401; 241/25, 27, 29, 30, 101.2, 101.5, 277, 280; 442/135; 428/911; 2/2.5; 264/911, 913

(56) References Cited

U.S. PATENT DOCUMENTS

| | | | |
|---|---|---|---|
| 3,803,453 A | | 4/1974 | Hull |
| 4,612,150 A | | 9/1986 | De Howitt |
| 4,860,530 A | * | 8/1989 | Montgomery et al. ........... 57/5 |
| 5,033,262 A | * | 7/1991 | Montgomery et al. ........... 57/5 |
| 5,305,593 A | | 4/1994 | Rodini et al. |
| 5,331,801 A | * | 7/1994 | Heifetz ....................... 57/400 |
| 5,369,861 A | | 12/1994 | Ball et al. |
| 5,481,864 A | * | 1/1996 | Wright ........................ 57/400 |
| 5,535,945 A | * | 7/1996 | Sferrazza et al. ........ 241/24.12 |
| 5,687,916 A | * | 11/1997 | Romano et al. ............... 241/1 |
| 5,704,104 A | * | 1/1998 | Bacon et al. ................. 28/299 |
| 5,719,198 A | * | 2/1998 | Young et al. ............... 521/40.5 |
| 5,876,834 A | | 3/1999 | Foy et al. |
| 5,919,717 A | * | 7/1999 | Wallick ....................... 28/100 |
| 6,061,876 A | * | 5/2000 | Rowe ............................ 19/98 |
| 6,103,646 A | | 8/2000 | Chiou |
| 6,241,168 B1 | * | 6/2001 | Young et al. ................. 241/23 |
| 6,378,179 B1 | * | 4/2002 | Hirsch ......................... 28/103 |
| 2001/0023903 A1 | * | 9/2001 | Korte ..................... 241/24.18 |

* cited by examiner

*Primary Examiner*—Amy B. Vanatta

(57) ABSTRACT

The present invention is directed to a process for recycling a fabric containing high performance fibers having a tenacity of at least 10 grams per dtex and a tensile modulus of at least 150 grams per dtex, to make a yarn from the fabric. In the process, and the fabric is cut into pieces where the largest dimension is no larger than 15 centimeters. From 30 to 99 weight percent staple fibers are added to the fabric pieces to make a blend and the fibers of the blend are separated and aligned into a sliver, and the sliver is formed into a twisted yarn. This yarn may be used to make a fabric or any other useful article.

23 Claims, No Drawings

PROCESS FOR RECYCLING ARTICLES CONTAINING HIGH-PERFORMANCE FIBER

BACKGROUND OF THE INVENTION

1. Field of the Invention

The present invention is directed to recycling articles that include high-performance fiber into yarns and articles made therefrom.

2. Description of the Related Art

Fabrics that include high-performance fibers such as aramid fiber are well-known in the art. These fabrics may be used in a wide variety of articles to increase the ballistic resistance or cut and abrasion resistance of those articles. Examples of such articles are bullet resistant vests, gloves, chaps, and the like.

U.S. Pat. No. 6,103,646 discloses a penetration resistant ballistic article which includes an outer face made from a plurality of tightly woven layers of aramid yarns and an inner face of a plurality of layers of ballistic resistant fibrous material such as aramid yarns.

U.S. Pat. No. 5,876,834 discloses protective chain saw chaps made from a fabric of aramid yarns.

Fabrics that include high-performance fibers or yarns are used to make many other articles, such as cut-resistant gloves and the like.

A problem with articles made from fabric that includes high-performance fiber is how to dispose of such articles. Articles such as ballistic resistant vests usually have a useful life of 5 to 10 years, after which time the vests must be replaced, which raises the issue of how to dispose of the worn vests. There is an ongoing need to reduce waste through recycling. The general concept of recycling waste fabric is known. See for example U.S. Pat. No. 5,369,861 which discloses a process for recycling denim waste. A continuing need exists for new and improved recycling processes.

SUMMARY OF THE INVENTION

The present invention is directed to a process for recycling a fabric, which fabric includes high performance fibers having a tenacity of at least 10 grams per dtex and a tensile modulus of at least 150 grams per dtex, to make a yarn from the fabric. In the process, a fabric is provided that includes fibers having a tenacity of at least 10 grams per dtex and a tensile modulus of at least 150 grams per dtex, and the fabric is cut into pieces no dimension larger than 15 centimeters. From 30 to 99 weight percent staple fibers on a basis of staple fibers and high performance fibers are added to the fabric pieces to make a blend and the fibers of the blend are separated and aligned into a sliver, and the sliver is formed into a twisted yarn. This yarn may be used to make a fabric or any other useful article. Additional fibers may be present in the yarn.

DETAILED DESCRIPTION

The present invention is directed to recycling articles that include high-performance fiber to make a yarn that may be used to make other articles.

Articles that include high-performance fibers or high performance yarns, which are typically present in the form of continuous multifilament yarns, have many uses, including bullet resistant vests, cut resistant gloves, chaps, and the like. In the process of the invention, the article that incorporates a fabric having high-performance fiber is disassembled or taken apart so as to provide the fabric without any covering, stitching or the like. For example, a bullet resistant vest typically includes a plurality of fabric layers stitched together that are usually covered by a shell or other covering fabric. The outer shell or covering fabric is removed to reveal the plurality of fabric layers, and the stitching of the fabric layers is removed so that what is left is only the fabric sheets that include high-performance fiber. Some stitching may remain in the fabric but is usually not desirable because the stitching leads to a yarn of a lower quality.

Articles and fabrics of the present invention are made, in whole or in part, from yarns that include high performance fibers. As used herein, the term "high performance fibers" means fibers having a tenacity of at least 10 grams per dtex and a tensile modulus of at least 150 grams per dtex. Such yarns can be made from fibers such as aramids, polyolefins, polybenzoxazole, polybenzothiazole, and the like, and may be made from mixtures of such yarns.

The fabric may include up to 100 percent aramid fiber. By "aramid" is meant a polyamide wherein at least 85% of the amide (—CO—NH—) linkages are attached directly to two aromatic rings. Examples of aramid fibers are described in Man-Made Fibers—Science and Technology, Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511.

Para-aramids are common polymers in aramid yarn and poly(p-phenylene terephthalamide)(PPD-T) is a common para-aramid. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether. For the purposes of this invention, para-aramid also includes highly modified wholly aromatic copolyamides such as copoly(p-phenylene/3,4'-diphenyl ether terephthalamide).

By "polyolefin" is meant polyethylene or polypropylene. By polyethylene is meant a predominantly linear polyethylene material of preferably more than one million molecular weight that may contain minor amounts of chain branching or comonomers not exceeding 5 modifying units per 100 main chain carbon atoms, and that may also contain admixed therewith not more than 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. Such is commonly known as extended chain polyethylene (ECPE). Similarly, polypropylene is a predominantly linear polypropylene material of preferably more than one million molecular weight. High molecular weight linear polyolefin fibers are commercially available.

Polybenzoxazole and polybenzothiazole are preferably made up of polymers of the following structures:

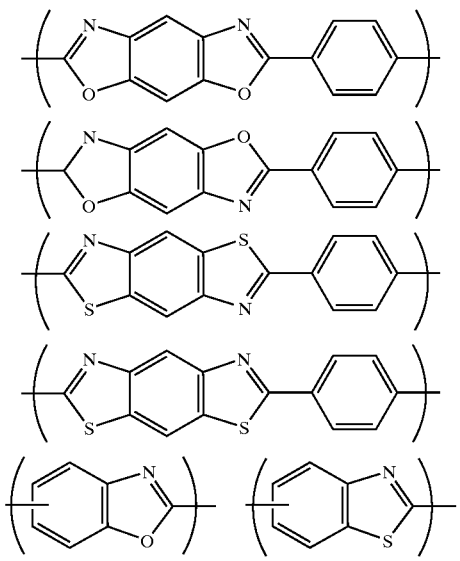

While the aromatic groups shown joined to the nitrogen atoms may be heterocyclic, they are preferably carbocyclic; and while they may be fused or unfused polycyclic systems, they are preferably single six-membered rings. While the group shown in the main chain of the bis-azoles is the preferred para-phenylene group, that group may be replaced by any divalent organic group which does not interfere with preparation of the polymer, or no group at all. For example, that group may be aliphatic up to twelve carbon atoms, tolylene, biphenylene, bis-phenylene ether, and the like.

The fabric is then cut into relatively small pieces, preferably with a largest dimension no longer than fifteen centimeters (six inches) and more preferably no longer than five centimeters (two inches). Pieces of cut fabric which are longer than fifteen centimeters (six inches) are typically removed because those longer pieces have the potential to cause problems when that cut fabric is made into a yarn. For short staple processing, pieces of cut fabrics which have a largest dimension greater than five centimeters (two inches) are typically removed. It is understood that in the present invention a maximum size of the cut fabric will be dependent on later process steps in making a yarn. Illustratively, smaller fabric pieces will be employed in a short staple (cotton) system of manufacture compared to other known techniques of yarn formation used for long staple (woolen or worsted systems).

A preferred means of cutting the fabric is by use of guillotine cutters which cut a number of different angles. A typical guillotine cutter will cut at six different angles. While a guillotine cutter is preferred, the selection of a cutting device is not critical to the invention provided the fabric is cut into pieces of the correct size.

The pieces of cut fabric are blended with 30 to 99, and preferably 50 to 95, weight percent staple fibers on the basis of the staple fibers in combination with the high performance fibers in the cut yarn. As used herein, "staple fibers" means any natural or synthetic fibers having a length of no greater than 15 centimeters with the proviso that the staple fibers differ from the composition of the high performance fibers. Therefore the purpose of this disclosure the staple fiber could also be a high performance fiber provided it is a composition which differs from the high performance fiber of the cut fabric pieces.

Also it is understood that in the present invention additional virgin, i.e., non-recycled high performance fiber may be added in manufacture of the yarn. The virgin high performance fiber may be present to facilitate processing. Illustratively, equal amounts of recycled high performance fiber in the cut fabric and virgin high performance fiber may be employed Examples of suitable staple fibers include cotton, wool, polyester, polyamide, rayon and mixtures thereof as well as the high performance fibers listed above. Also other fibers may be included, e.g. for anti-static properties. Suitable anti-static properties are described, for example, in U.S. Pat. No. 3,803,453 and U.S. Pat. No. 4,612,150.

This blend is then formed into a sliver. A preferred method for forming the blend into a sliver is with a carding machine, a machine commonly used in the fiber industry to separate, align, and deliver fibers into a continuous strand of loosely assembled fibers without twist, commonly known as a sliver.

When the cut pieces of fabric are processed through a carding machine, the card separates the individual fibers in the fabric and the recycled fibers along with any other fibers in the blend are formed into a wispy web, which is conventionally made into a sliver of one inch diameter. The sliver is then made into a roving through a conventional drawing process and then typically formed into a twisted yarn using any common method for making spun yarns, e.g. a ring-spinning machine.

Alternatively, the sliver may be spun directly to a yarn, using for example an open-end spinning machine an example of which is a Murata jet air spinner, or a core-spinning machine, an example of which is a DREF friction spinner.

There is no limitation on the types or size of yarns that may be made according to the process of the invention. However, this process is especially suited for providing staple yarns having a singles yarn count of 8.5 numbers metric (about an English cotton count of 5) or finer, and preferably yarns having a singles yarn count of 8.5 to 34 numbers metric (about 5 to 20 English cotton count). These single yarns can also be combined to form plied yarns.

The yarn that includes the recycled high-performance fiber may be used to make fabrics in a conventional manner. Such fabrics may include any amount of the recycled yarn. A fabric made using the yarn made from this invention may be used in any other article into which yarn containing high-performance fiber is used, such as tents, gloves, chaps, helmets, clothing, and the like.

EXAMPLES

In the following examples all parts and percentages are by weight unless otherwise indicated.

Used ballistic vests were dismantled by removing the cover material and stitching that hold the multiple 100% aramid fabric layers together. The separated 100% aramid fabric layers were cut into pieces of varying shapes using a guillotine cutting process. For this example, the process was set up to control the size of the pieces such that the longest cut fiber length size would not exceed 5 centimeters (2 inches).

The cut fabric pieces were rechecked to ensure the cut fiber length would not exceed 5 centimeters. Pieces where the longest cut fiber length exceeded 5 centimeters (2") were removed. With short staple cotton system processing equipment employed, it was considered that fiber lengths greater than 5.5 cm (2.25 inches) had the potential to cause cockles. Cockles are formed when an excessively long fiber is caught between two draft rolls. The caught fiber breaks, recoils and forms a curled, kinked section of rough and uneven yarn. This defect causes downstream processing problems and poor yarn uniformity.

However it is understood that with greater draft roll spacing, longer fiber lengths could be used without the potential for cockles.

Two short tests were run at different percentages of the recycled material.

Two 11.4 kilogram (25 lb) samples were prepared of the following composition:

Spun Yarn Example 1:
a. Middling grade carded cotton—70% by weight
b. Recycled para-aramid ballistic fabric—12.5% by weight
c. 1.7 dtex per filament (1.5 dpf )×3.8 cm (1.5") para-aramid staple—12.5% by weight
d. 4.3 dtex per filament (3.9 dpf)×3.8 cm (1.5") nylon/carbon sheath/core anti-static fiber—5% by weight Spun Yarn Example 2:
a. Middling grade carded cotton—55% by weight
b. 2.0 dtex per filament (1.8 dpf)×3.8 cm (1.5") nylon staple—15% by eight
c. Recycled para-aramid ballistic fabric—12.5% by weight
d. 1.7 dtex per filament (1.5 dpf)×3.8 cm (1.5") para-aramid staple—12.5% by weight
e. 4.3 dtex per filament (3.9 dpf)×3.8 cm (1.5") nylon/carbon sheath/core anti-static fiber—5% by weight Note: In Examples 1 and 2, the para-aramid was poly p(phenylene terephthalamide).

The 11.4 kilogram (25 lb) staple samples were first hand mixed and fed twice through a Kitson/Saco Lowell Picker to uniformize the blend of different fibers. Once blended, each sample was fed through a Double Lickerin Roll/Single Cylinder Davis Furber Roller top Card, with comb take-off, to make carded sliver. The roller top carding system is preferred to a flat top carding system. This process enabled the separation of the cut 100% aramid ballistic fabric pieces and other blended staple fibers into a sliver comprised of separated filaments.

The above carding process used to separate the cut 100% aramid ballistic fabric pieces is preferred to feeding the 100% aramid ballistic fabric pieces to the card individually, then hand mixing. Without blending the card is not as effective in separating the fabric pieces into separate filaments.

The carded sliver was spun into staple yarn using conventional short staple ring spinning. The carded sliver was processed using two pass drawing (breaker/finisher drawing) into drawn sliver using a Saco Lowell Versamatic/Shaw Drafting System 4 Over 5. The drawn sliver was then processed into roving on a Saco Lowell 1/B/F/B Roving Frame. The roving was then processed into an 14 numbers metric (8 cc) staple spun yarn on a Roberts Arrow Spinning Frame with 5 cm (2 inch) ring. A 121 twist multiplier (turns per meter/(nM)$^{1/2}$) (or 4.0 twist multiplier in English cotton count system (turns per inch/(cc)$^{1/2}$)) was used for the spun yarn.

Since typical average cotton staple lengths range from 2.9 cm to 3.5 cm (1⅛ inch to 1⅜ inch), using aramid fibers with similar length was considered the best drafting results and spun yarn weight uniformity (also referred to as yarn evenness).

Cotton system ring spinning was selected to give the best draft uniformity of the aramid with cotton.

Weaving Example 1

The 14 numbers metric (8 cotton count) staple spun yarn from Spun Yarn Example 1 was used as filling yarn to weave denim fabric on a conventional Tsudakoma Model 209 air-jet loom. The warp yarn was consisted of two types of spun yarn in approximately end-on-end design. The first type was a 16 numbers metric (9.5 c. c.) ring-spun yarn of 84 wt. % cotton and 16 wt. % virgin para-aramid staple of 3.8 centimeter length. The second type was a 16 numbers metric (9.5 c. c.) ring-spun yarn of 84 wt. % cotton and 16 wt. % polyester staple of 3.8 centimeter length. The fabric was a 3×1 right-hand twill weave with a construction of 23.6 ends/cm and 15.7 picks/cm on loom. The fabric was sanforized in a conventional process and the sanforized fabric has a basis weight of 354 g/m².

Weaving Comparative Example 1

The same process was repeated as in Example 1 with the exception of the filling yarn being 100% ring-spun cotton yarn of 14 numbers metric (8 cotton count). The sanforized fabric has a basis weight of 370 g/m².

Weaving Comparative Example 2

The same process was repeated as in Example 1 with the exception of the filling yarn being a 14 numbers metric (8 c. c.) ring-spun yarn of 75 wt. % cotton and 25 wt. % black-color virgin para-aramid staple of 3.8 centimeter length. The sanforized fabric has a basis weight of 366 g/m².

Testing

Two critical tests were conducted on the fabric samples, particularly in the filling yarn direction, to determine the fabric properties. The fabric breaking strength was measured per ASTM D 5034 "Standard Test Method for Breaking Strength and Elongation of Textile Fabrics (Grab Test)". The fabric tearing strength was measured per ASTM D 1424 "Standard Test Method for Tearing Strength of Fabrics by Falling-Pendulum Type (Elmendorf) Apparatus". Separately, the fabric electrostatic charge decay was tested per Federal Standard 191A Method 5931 "Determination of Electrostatic Decay of Fabrics". The samples were conditioned and tested at 21° C. and 20% relative humidity.

The following represents a summary of test results of fabric from Weaving Example 1 compared to Comparative Examples of 100% cotton and 75% cotton/25% para-aramid.

Test Results

| Fabric Sample | Composition of Filling Yarn | Fabric Breaking Strength in Fill Direction (Newton) | Fabric Tearing Strength in Fill Direction (Newton) | Time to Static Decay in Fill Direction (s) |
|---|---|---|---|---|
| Weaving Example 1 | 70 wt % cotton 12.5 wt. % recycled para-aramid 12.5 wt. % virgin para-aramid 5 wt. % anti-static fiber | 761 | 134 | 0.01 |

-continued

Test Results

| Fabric Sample | Composition of Filling Yarn | Fabric Breaking Strength in Fill Direction (Newton) | Fabric Tearing Strength in Fill Direction (Newton) | Time to Static Decay in Fill Direction (s) |
|---|---|---|---|---|
| Weaving Comparative Example 1 | 100% cotton | 560 | 62 | 0.34 |
| Weaving Comparative Example 2 | 75 wt. % cotton 25 wt. % virgin para-aramid | 743 | 145 | 0.25 |

What is claimed is:

1. A process for recycling a fabric that includes high performance fibers having a tenacity of at least 10 grams per dtex and a tensile modulus of at least 150 grams per dtex to make a yarn from the fabric comprising the steps of
providing a fabric that includes fibers having a tenacity of at least 10 grams per dtex and a tensile modulus of at least 150 grams per dtex,
cutting the fabric into pieces having a largest dimension no larger than 15 centimeters,
adding staple fibers to the fabric pieces to make a blend,
separating and aligning the fibers of the blend into a sliver, and
forming the sliver into a twisted yarn,
wherein the high performance fibers are present in an amount of 1 to 70 weight percent and the staple fibers are present in an amount of 30 to 99% on the basis of the high performance and staple fibers.

2. The process of claim 1, wherein the fabric includes fibers of aramid, polyolefin, polybenzoxazole, polybenzothiazole or mixtures thereof.

3. The process of claim 1, wherein the fabric includes fibers of para-aramid.

4. The process of claim 1, wherein the fabric includes fibers of poly(p-phenylene terephthalamide).

5. The process of claim 1, wherein the fabric includes fibers of copoly(p-phenylene/3,4'-diphenyl ether terephthalamide).

6. The process of claim 1, wherein the fibers of the blend are separated and aligned into a sliver by feeding the blend to a carding machine.

7. The process of claim 1, wherein the fabric is cut into pieces having a largest dimension no longer than 5 centimeters.

8. The process of claim 1 wherein the staple fibers have a length not greater than 15 centimeters.

9. The process of claim 1 where in the sliver contains additional fibers.

10. A yarn made from the process of claim 1.

11. A fabric which comprises a yarn made from the process of claim 1.

12. An article which comprises the fabric of claim 11.

13. A process for recycling a ballistic article to make a yarn from a fabric comprising the steps of
providing a ballistic article comprising a plurality of layers of fabric having fibers with a tenacity of at least 10 grams per dtex and a tensile modulus of at least 150 grams per dtex,
removing any covering present on the ballistic article to uncover the plurality of layers of fabric,
substantially removing any stitching present in the plurality of layers of fabric,
cutting the fabric into pieces having a largest dimension of no larger than 15 centimeters,
adding staple fibers to the fabric pieces to make a blend,
separating and aligning the fibers of the blend into a sliver, and
forming the sliver into a twisted yarn,
wherein the high performance fibers are present in an amount of 1 to 70 weight percent and the staple fibers are present in an amount of 30 to 99% on the basis of the high performance and staple fibers.

14. The process of claim 13, wherein the fabric includes fibers of aramid, polyolefin, polybenzoxazole, polybeuzothiazole or mixtures thereof.

15. The process of claim 13, wherein the fabric includes fibers of para-aramid.

16. The process of claim 13, wherein the fabric includes fibers of poly(p-phenylene terephthalamide).

17. The process of claim 13, wherein the fibers of the blend are separated and aligned into a sliver by feeding the blend to a carding machine.

18. The process of claim 13, wherein the fabric is cut into pieces having a largest dimension no longer than 5 centimeters.

19. The process of claim 13 wherein the staple fibers have a length not greater than 15 centimeters.

20. The process of claim 13 wherein the sliver contains additional fibers.

21. A yarn made from the process of claim 13.

22. A fabric which comprises a yarn made from the process of claim 13.

23. An article which comprises the fabric of claim 22.

* * * * *